United States Patent
Alkan et al.

(10) Patent No.: US 12,110,392 B2
(45) Date of Patent: Oct. 8, 2024

(54) FILLED POLYAMIDE MOULDING COMPOUNDS, MOULDED ARTICLES PRODUCED THEREFROM, AND USE OF THE FILLED POLYAMIDE MOULDING COMPOUNDS

(71) Applicant: EMS-CHEMIE AG, Domat/Ems (CH)

(72) Inventors: Arda Alkan, Domat/Ems (CH); Andri Cadalbert, Bonaduz (CH); Andreas Bayer, Domat/Ems (CH); Botho Hoffmann, Domat/Ems (CH)

(73) Assignee: EMS-CHEMIE AG, Domat/Ems (CH)

( * ) Notice: Subject to any disclaimer, the term of this patent is extended or adjusted under 35 U.S.C. 154(b) by 146 days.

(21) Appl. No.: 17/551,371

(22) Filed: Dec. 15, 2021

(65) Prior Publication Data

US 2022/0195186 A1  Jun. 23, 2022

(30) Foreign Application Priority Data

Dec. 17, 2020  (EP) ................ 20 215 157.7

(51) Int. Cl.
*C08L 77/06* (2006.01)

(52) U.S. Cl.
CPC ................ *C08L 77/06* (2013.01)

(58) Field of Classification Search
CPC ........... C08L 77/02–06; C08L 2201/08; C08L 2666/52; C08L 2666/72
See application file for complete search history.

(56) References Cited

U.S. PATENT DOCUMENTS

| | | | |
|---|---|---|---|
| 3,766,131 A | 10/1973 | Arkles | |
| 6,482,889 B1 | 11/2002 | Kurz | |
| 7,723,411 B2 | 5/2010 | Schneider | |
| 7,973,191 B2 | 7/2011 | Doring et al. | |
| 8,022,170 B2 | 9/2011 | Hoffman et al. | |
| 8,268,956 B2 | 9/2012 | Bühler et al. | |
| 8,383,244 B2 | 2/2013 | Bayer et al. | |
| 8,404,323 B2 | 3/2013 | Pfleghar et al. | |
| 8,586,662 B2 | 11/2013 | Harder et al. | |
| 8,604,120 B2 | 12/2013 | Stöppelmann et al. | |
| 8,993,662 B2 | 3/2015 | Kaplan | |
| 9,109,115 B2 | 8/2015 | Buhler et al. | |
| 9,133,322 B2 | 9/2015 | Roth et al. | |
| 9,359,532 B2 | 6/2016 | Kaplan | |
| 9,453,106 B2 | 9/2016 | Buhler et al. | |
| 9,644,081 B2 | 5/2017 | Aepli et al. | |
| 9,663,655 B2 | 5/2017 | Aepli | |
| 9,815,967 B2 | 11/2017 | Harder et al. | |
| 9,963,547 B2 | 5/2018 | Hoppe et al. | |
| 9,963,591 B2 | 5/2018 | Bayer et al. | |
| 9,969,882 B2 | 5/2018 | Thomas et al. | |
| 10,005,268 B2 | 6/2018 | Jeltsch et al. | |
| 10,047,054 B2 | 8/2018 | Kaplan | |
| 10,144,805 B2 | 12/2018 | Bayer et al. | |
| 10,233,326 B2 | 3/2019 | Koch et al. | |
| 10,544,286 B2 | 1/2020 | Nakano et al. | |
| 10,577,478 B2 | 3/2020 | Fujii et al. | |
| 10,683,418 B2 | 6/2020 | Thomas et al. | |
| 10,717,816 B2 | 7/2020 | Aepli et al. | |
| 10,751,961 B2 | 8/2020 | Cheung | |
| 10,767,047 B2 | 9/2020 | Aepli et al. | |
| 10,767,048 B2 | 9/2020 | Aepli et al. | |
| 10,836,905 B2 | 11/2020 | Wiedemann et al. | |
| 10,843,389 B2 | 11/2020 | Weis et al. | |
| 10,882,975 B2 | 1/2021 | Stöppelmann | |
| 10,889,713 B2 | 1/2021 | Schubert et al. | |
| 10,899,527 B2 | 1/2021 | Sütterlin et al. | |
| 10,927,254 B2 | 2/2021 | Stöppelmann et al. | |
| 11,059,950 B2 | 7/2021 | Holzschuh et al. | |
| 11,091,590 B2 | 8/2021 | Hoffmann et al. | |
| 11,098,194 B2 | 8/2021 | Aepli et al. | |
| 11,186,716 B2 | 11/2021 | Sütterlin et al. | |
| 11,254,083 B2 | 2/2022 | Caviezel | |
| 11,254,794 B2 | 2/2022 | Holzschuh et al. | |
| 11,274,204 B2 | 3/2022 | Wiedemann | |
| 2006/0235190 A1 | 10/2006 | Hoffman et al. | |
| 2006/0264542 A1 | 11/2006 | Schneider | |
| 2008/0135720 A1 | 6/2008 | Bühler et al. | |
| 2008/0300347 A1 | 12/2008 | Kurz et al. | |
| 2010/0069657 A1 | 3/2010 | Doring et al. | |
| 2010/0168423 A1 | 7/2010 | Doring et al. | |
| 2010/0279111 A1 | 11/2010 | Harder et al. | |
| 2011/0220667 A1 | 9/2011 | Pfleghar et al. | |

(Continued)

FOREIGN PATENT DOCUMENTS

| | | | |
|---|---|---|---|
| CN | 102604378 A | * | 7/2012 |
| CN | 104017363 A | * | 9/2014 |

(Continued)

OTHER PUBLICATIONS

US 10,875,999 B2, 12/2020, Stöppelmann et al. (withdrawn)
US 11,332,575 B2, 05/2022, Aepli et al. (withdrawn)
CN 102604378 A machine translation (Jul. 2012).*
CN 104017363 A machine translation (Sep. 2014).*
CN 109777097 A machine translation (May 2019).*
U.S. Appl. No. 09/533,280, filed Mar. 22, 2000.
U.S. Appl. No. 10/536,494, filed May 24, 2005.
U.S. Appl. No. 10/553,259, filed Oct. 11, 2005.
U.S. Appl. No. 11/950,964, filed Dec. 5, 2007.

(Continued)

*Primary Examiner* — Ana L. Woodward

(74) *Attorney, Agent, or Firm* — Leydig, Voit & Mayer, Ltd.

(57) ABSTRACT

The present invention relates to filled polyamide moulding compounds with a high heat-ageing resistance which, besides a specific polyamide mixture, also comprise at least one filler, at least one unsubstituted or substituted metallocene and optionally at least one additive. The invention also relates to the use of these polyamide moulding compounds to produce moulded articles.

12 Claims, No Drawings

(56) References Cited

U.S. PATENT DOCUMENTS

| | | |
|---|---|---|
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0136911 A1 | 5/2013 | Bender et al. |
| 2013/0317168 A1 | 11/2013 | Buhler et al. |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Buhler et al. |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0280914 A1 | 9/2016 | Thomas et al. |
| 2016/0297123 A1 | 10/2016 | Weis et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251600 A1 | 9/2018 | Hoffmann et al. |
| 2018/0298191 A1 | 10/2018 | Schubert et al. |
| 2019/0055356 A1 | 2/2019 | Aepli et al. |
| 2019/0055404 A1 | 2/2019 | Aepli et al. |
| 2019/0055405 A1 | 2/2019 | Aepli et al. |
| 2019/0062554 A1 | 2/2019 | Wiedemann et al. |
| 2019/0136053 A1 | 5/2019 | Fujii et al. |
| 2020/0024415 A1 | 1/2020 | Holzschuh et al. |
| 2020/0024416 A1 | 1/2020 | Holzschuh et al. |
| 2020/0109284 A1 | 4/2020 | Wiedemann |
| 2020/0198203 A1 | 6/2020 | Caviezel |
| 2021/0032464 A1 | 2/2021 | Stöppelmann |
| 2021/0032465 A1 | 2/2021 | Wiedemann et al. |
| 2021/0032466 A1 | 2/2021 | Stöppelmann |
| 2021/0040264 A1 | 2/2021 | Harder et al. |
| 2021/0040317 A1 | 2/2021 | Harder et al. |
| 2021/0115250 A1 | 4/2021 | Wiedemann et al. |
| 2021/0189124 A1 | 6/2021 | Alkan et al. |
| 2021/0189125 A1 | 6/2021 | Alkan et al. |

FOREIGN PATENT DOCUMENTS

| | | | |
|---|---|---|---|
| CN | 109777097 A | * | 5/2019 |
| EP | 1 681 313 A1 | | 7/2006 |
| EP | 2 535 365 A1 | | 12/2012 |
| EP | 2 902 444 A1 | | 8/2015 |

OTHER PUBLICATIONS

U.S. Appl. No. 12/091,024, filed Apr. 21, 2008.
U.S. Appl. No. 12/539,972, filed Aug. 12, 2009.
U.S. Appl. No. 12/540,007, filed Aug. 12, 2009.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/290,718, filed Nov. 7, 2011.
U.S. Appl. No. 13/421,541, filed Mar. 15, 2012.
U.S. Appl. No. 13/481,451, filed May 25, 2012.
U.S. Appl. No. 13/674,395, filed Nov. 12, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/078,134, filed Nov. 12, 2013.
U.S. Appl. No. 14/204,404, filed Mar. 11, 2014.
U.S. Appl. No. 14/205,667, filed Mar. 12, 2014.
U.S. Appl. No. 14/221,930, filed Mar. 21, 2014.
U.S. Appl. No. 14/397,529, filed Oct. 28, 2014.
U.S. Appl. No. 14/397,534, filed Oct. 28, 2014.
U.S. Appl. No. 14/504,651, filed Oct. 2, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642. filed Nov. 9, 2015.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,891, filed Mar. 2, 2018.
U.S. Appl. No. 15/955,737, filed Apr. 18, 2018.
U.S. Appl. No. 16/094,198, filed Oct. 16, 2018.
U.S. Appl. No. 16/104,028, filed Aug. 16, 2018.
U.S. Appl. No. 16/104,035, filed Aug. 16, 2018.
U.S. Appl. No. 16/104,043, filed Aug. 16, 2018.
U.S. Appl. No. 16/115,055, filed Aug. 28, 2018.
U.S. Appl. No. 16/515,119, filed Jul. 18, 2019.
U.S. Appl. No. 16/515,151, filed Jul. 18, 2019.
U.S. Appl. No. 16/595,559, filed Oct. 8, 2019.
U.S. Appl. No. 16/717,369, filed Dec. 17, 2019.
U.S. Appl. No. 16/956,564, filed Jun. 20, 2020.
U.S. Appl. No. 16/956,576, filed Jun. 20, 2020.
U.S. Appl. No. 16/956,579, filed Jun. 20, 2020.
U.S. Appl. No. 16/956,580, filed Jun. 20, 2020.
U.S. Appl. No. 16/987,913, filed Aug. 7, 2020.
U.S. Appl. No. 16/988,011, filed Aug. 7, 2020.
U.S. Appl. No. 17/129,507, filed Dec. 21, 2020.
U.S. Appl. No. 17/129,606, filed Dec. 21, 2020.
U.S. Appl. No. 17/551,547, filed Dec. 15, 2021.

* cited by examiner

FILLED POLYAMIDE MOULDING COMPOUNDS, MOULDED ARTICLES PRODUCED THEREFROM, AND USE OF THE FILLED POLYAMIDE MOULDING COMPOUNDS

This patent application claims the benefit of European Patent Application No. 20 215 157.7, filed on Dec. 17, 2021, the disclosure of which is incorporated herein by reference in its entirety for all purposes.

The present invention relates to filled polyamide moulding compounds with a high heat-ageing resistance which, besides a specific polyamide mixture, also comprise at least one filler, at least one unsubstituted or substituted metallocene and optionally at least one additive. The invention also relates to the use of these polyamide moulding compounds to produce moulded articles.

Polyamides can be used as materials for moulded articles which, during their service life, are exposed to elevated temperatures. The improvement of the heat-ageing resistance of polyamides is highly desirable, since longer service lives can thus be achieved for thermally stressed components, or their risk of failure can be reduced. Alternatively, an improved heat-ageing resistance can also allow the use of the components at elevated temperatures.

Thermoplastic polyamides can be used as construction materials for components which, during their service life, are exposed to elevated temperatures. Since thermooxidative damage occurs in this case, heat stabilisers are used which delay the occurrence of thermooxidative damage.

Long-term heat-stabilised polyamide moulding compounds are known from EP 2 535 365 A1, in which there are incorporated moulding compounds based on a partially aromatic polyamide and caprolactam which are provided with copper stabilisers or with mixtures of copper stabilisers and organic stabilisers.

Document EP 2 902 444 A1 also relates to long-term heat-stabilised moulding compounds based on a partially aromatic polyamide and caprolactam. The long-term heat stabilisation is achieved here by the use of organic stabilisers.

Document EP 1 681 313 A1 also describes long-term-stabilised moulding compounds. The long-term heat stabilisation is achieved here y the use of at least two specific heat stabilisers (for example copper iodide and iron oxide) and by the use of two polyamides, which differ in respect of their melting temperature by at least 20° C.

Proceeding herefrom, the object of the present invention was to provide polyamide moulding compounds from which preferably moulding compounds can be produced, which are characterised in comparison to polyamide moulding compounds known from the prior art in particular by an improved heat-ageing resistance.

This object is achieved by the polyamide moulding compound described herein and the moulded article also described herein. Further advantageous refinements and uses according to the invention are also described.

In accordance with the invention, a polyamide moulding compound comprising or consisting of the following components (A) to (D) is provided:
(A) 27 to 89.99 wt. % of at least one partially crystalline, partially aromatic polyamide (A1) or a polyamide mixture consisting of
at least one partially crystalline, partially aromatic polyamide, and
at least one caprolactam-containing polyamide with a content of caprolactam of at least 50 wt. %, different from the partially crystalline, partially aromatic polyamide (A1),
the caprolactam content, in relation to the polyamide mixture, being 5 to 38 wt. %,
10 to 65 wt. % of at least one filler,
(B) 0.01 to 3.0 wt. % of at least one unsubstituted or substituted metallocene,
(C) 0 to 35 wt. % of at least one additive, the components (A) to (D) adding up to 100 wt. %.

It was surprisingly found that the use of metallocenes, in particular ferrocenes, in conjunction with the selected at least one partially crystalline, partially aromatic polyamide or the selected polyamide mixtures, makes it possible to achieve a significantly improved heat-ageing resistance.

Furthermore, the ferrocene-containing polyamide moulding compounds according to the invention showed a significantly improved flowability in the spiral flow test.

DEFINITIONS OF TERMS

Designations and Abbreviations for Polyamides and the Monomers Thereof

In the sense of the present invention, the term "polyamide" (abbreviation PA) is understood as an umbrella term; it comprises homopolyamides and copolyamides. The selected designations and abbreviations for polyamides and their monomers correspond to those defined in ISO standard 16396-1 (2015, (D)). The abbreviations used therein are used hereafter synonymously for the IUPAC names of the monomers. In particular, the following abbreviations for monomers appear in the present application. 6 for 1,6-hexanediamine (CAS no. 124-09-4), T for terephthalic acid (CAS no. 100-21-0), I for isophthalic acid (CAS no. 121-95-5), 6 for 1,6-hexanedioic acid (CAS no. 124-04-9), 6 for caprolactam (CAS no. 105-60-2), MACM for bis(4-amino-3-methyl-cyclohexyl)methane (also referred to as 3,3'-dimethyl-4,4'-diaminodicyclohexylmethane, CAS no. 6864-37-5), TMDC for bis(4-amino-3,5-dimethyl-cyclohexyl) methane (also referred to as 3,3',5,5'-tetramethyl-4,4'-diaminodicyclohexylmethane, CAS no. 65962-45-0), PACM for bis(4-amino-cyclohexyl)methane (also referred to as 4,4'-diaminodicyclohexylmethane, CAS no. 1761-71-3), BAC for 1,3-bis(aminomethyl)cyclohexane (also referred to as 1,3-cyclohexanedimethanamine CAS no. 2579-20-6) and for 1,4-bis(aminomethyl)-cyclohexane (also referred to as 1,4-cyclohexanedimethanamine, CAS no. 2549-93-1) and for mixtures thereof, IPD for isophoronediamine (also referred to as 3-(aminomethyl)-3,5,5-trimethyl-cyclohexaneamine, 1-amino-3-aminomethyl-3,5,5-trimethylcyclohexane or cyclohexanemethanamine,5-amino-1,3,5, 5-trimethyl, CAS no. 2855-13-2), MPMD for 2-methyl-1, 5-pentanediamine (also referred to as 1,5-diamino-2-methylpentane, CAS no. 15520-10-2), MOD for 2-methyl-1,8-octanediamine (also referred to as 2-methyloctane-1,8-diamine, CAS no. 148528-05-6), 12 for dodecanedioic acid (also referred to as 1,10-decanedicarboxylic acid, CAS no. 693-23-2), CHD for cyclohexanedicarboxylic acid, 12 for lactam-12 (also referred to as laurolactam, CAS no. 947-04-6).

General Comments Regarding the Compositions

The terms "containing" and "comprising" in the present claims and in the description mean that further components are not ruled out. Within the scope of the present invention, the term "consisting of" is understood as a preferred embodiment of the terms "containing" or "comprising". If it is defined that a group "contains" at least a certain number of components or "comprises" these, this shall also be understood to mean that a group is disclosed which preferably "consists" of these components.

Quantity Information of the Monomers

If the polyamides (A1) comprise only diacids and diamines, their molar proportions thus add up to 50 mol % for the sum of all diamines and 50 mol % for the sum of all diacids, and the sum of the diamine and diacid proportions gives 100 mol % for the polyamide.

If the polyamides (A1) or (A2), besides diacids and diamines, also comprise lactams or ω-amino acids in an amount of x mol %, the sum of all diamines is thus still only (50-0.5x) mol % and the sum of all diacids (50-0.5x) mol %, in relation to 100 mol % polyamide.

With respect to the quantity information regarding the diacids and diamines of the polyamides, it always applies that the sum of the molar fractions of all diamines is equal to the sum of the molar fractions of all diacids.

General Comments Regarding the Quantity Information

The polyamide moulding compounds according to the present invention comprise or consist of the components (A), (B) and (C) and optionally (D); the provision applies here that the components (A), (B), (C) and (D) in sum supplement one another to 100 wt. %, with component (A) being composed of the component (A1) and optionally the component (A2). The defined ranges of the quantity information for the individual components (A), (B), (C) and (D) shall be understood such that, within the predefined ranges, a random quantity can be selected for each of the individual components, as long as the provision is satisfied that the sum of all components (A), (B), (C) and (D) gives 100 wt. %.

Partially Aromatic Polyamides

In the sense of the present invention, partially aromatic polyamides are polyamides that comprise at least one aromatic monomer. This at least one aromatic monomer is preferably a dicarboxylic acid. In the sense of the present invention, metaxylylenediamine (MXD, CAS no. 1477-55-0) and paraxylylenediamine (PXD, CAS no. 539-48-0) are not aromatic monomers. This is also true for all other monomers in which the amino or carboxy groups do not hang directly on the aromatic ring. The partially crystalline, partially aromatic polyamides of the present invention have a melting temperature and a heat of fusion which can be determined by means of differential scanning calorimetry (DSC) according to ISO 11357-3 (2013).

Metallocenes

The metallocenes are coordination compounds, more specifically complexes, or what are known as sandwich complexes. They are thus neither a metal oxide nor a metal salt.

One representative is, for example, unsubstituted or substituted bis($\eta^5$-cyclopentadienyl)iron. Bis($\eta^5$-cyclopentadienyl)iron is also referred to as ferrocene (CAS no. 102-54-5). Both names are used synonymously in this application.

Heat-Ageing Resistance

A good heat-ageing resistance shows itself in the slowing of the decrease in tear strength and/or elongation at break following storage of the moulded article at elevated temperatures, i.e. temperatures of at least 100° C., preferably at least 120° C., more preferably at least 140° C.

Polyamide Moulding Compound

The polyamide moulding compound according to the invention comprises the components (A), (B) and (C) and optionally (D) or consists of these, with component (A) being composed of the component (A1) and optionally the component (A2).

The polyamide moulding compound comprises or consists of the following components:

(A) 27 to 89.99 wt. % of at least one partially crystalline, partially aromatic polyamide (A1) or a polyamide mixture consisting of
  (A1) at least one partially crystalline, partially aromatic polyamide, and
  (A2) one or more caprolactam-containing polyamides with a content of caprolactam of at least 50 wt. %, different from the partially crystalline, partially aromatic polyamide (A1),
  the caprolactam content, in relation to the polyamide mixture, being 5 to 38 wt. %,
(B) 10 to 65 wt. % of at least one filler,
(C) 0.01 to 3.0 wt. % of at least one unsubstituted or substituted metallocene,
(D) 0 to 35 wt. % of at least one additive,
the components (A) to (D) adding up to 100 wt. %.

The proportion of component (A) in the polyamide moulding compound lies preferably in the range of 35 to 84.87 wt. %, more preferably in the range of 44.6 to 69.6 wt. %, in relation to the total weight of the polyamide moulding compound.

The proportion of component (B) in the polyamide moulding compound lies preferably in the range of 15 to 60 wt. %, more preferably in the range of 30 to 50 wt. %, in relation to the total weight of the polyamide moulding compound.

The proportion of component (A) in the polyamide moulding compound lies preferably in the range of 0.03 to 2.0 wt. %, more preferably in the range of 0.1 to 1.5 wt. %, in relation to the total weight of the polyamide moulding compound.

The proportion of component (D) in the moulding compound lies preferably in the range of 0.1 to 30 wt. %, more preferably from 0.3 to 25 wt. %, in relation to the total weight of the polyamide moulding compound.

The caprolactam content, in relation to polyamide mixture (A), i.e. to the sum of components (A1) and (A2), lies preferably in the range of 5 to 36 wt. %, more preferably in the range of 10 to 33 wt. %, even more preferably in the range of 15 to 30 wt. %.

The individual components of the polyamide moulding compound according to the invention will be described hereinafter in greater detail.

Component (A)

Component (A) is composed of the component (A1) and optionally the component (A2).

Component (A1)

According to a preferred embodiment of the present invention, the at least one partially crystalline, partially aromatic polyamide (A1) has:
  a relative viscosity (RV), measured according to EN ISO 307 (2007), of 1.45 to 2.10, preferably of 1.50 to 1.90, more preferably of 1.55 to 1.80, and/or
  a heat of fusion, measured according to EN ISO 11357-3 (2013), of at least 25 J/g, preferably at least 30 J/g, more preferably at least 35 J/g, and/or
  a melting temperature, measured according to EN ISO 11357-3 (2013), of at least 255° C., preferably 270° C. to 350° C., more preferably of 280 to 340° C.

According to a preferred embodiment of the present invention, the at least one partially crystalline, partially aromatic polyamide (A1) is formed from the monomers (a1.1) to (a1.2) and optionally (a1.3) and optionally (a1.4):
- (a1.1) at least one diamine, selected from the group consisting of 1,4-butanediamine, 1,5-pentanediamine, 1,6-hexanediamine, 1,8-octanediamine, 1,9-nonanediamine, 1,10-decanediamine, 1,12-dodecanediamine, 2-Methyl-1,5-pentanediamine, 2-methyl-1,8-octanediamine, bis(4-amino-cyclohexyl)methane, bis(4-amino-3-methyl-cyclohexyl)methane, bis(4-amino-3,5-dimethyl-cyclohexyl)methane, bis(aminomethyl) cyclohexane, isophoronediamine, m-xylylenediamine and p-xylylenediamine, and
- (a1.2) at least one aromatic dicarboxylic acid, selected from the group consisting of terephthalic acid, isophthalic acid and naphthalenedicarboxylic acid, and/or
- (a1.3) at least one dicarboxylic acid, selected from the group consisting of 1,6-hexanedioic acid, 1,9-nonanedioic acid, 1,10-decanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, cyclohexanedicarboxylic acid and dimer fatty acids with 36 or 44 C atoms, and/or
- (a1.4) one or more lactams or w-amino acids, selected from the group consisting of lactam-6, lactam-11, lactam-12 1,6-aminohexanoic acid, 1,11-aminoundecanoic acid and 1,12-aminododecanoic acid.

According to a more preferred embodiment of the present invention, the at least one partially crystalline, partially aromatic polyamide (A1) is formed from the monomers (a1.1) to (a1.2) and optionally (a1.3) and optionally (a1.4):
- (a1.1) at least one diamine, selected from the group consisting of 1,4-butanediamine, 1,5-pentanediamine, 1,6-hexanediamine, 1,8-octanediamine, 1,9-nonanediamine, 1,10-decanediamine, 1,12-dodecanediamine, 2-methyl-1,5-pentanediamine, 2-methyl-1,8-octanediamine, bis(4-amino-cyclohexyl)methane, bis(4-amino-3-methyl-cyclohexyl)methane, and bis(aminomethyl) cyclohexane, and
- p(a1.2) at least one aromatic dicarboxylic acid, selected from the group consisting of terephthalic acid and isophthalic acid, and/or
- (a1.3) at least one dicarboxylic acid, selected from the group consisting of 1,6-hexanedioic acid, 1,10-decanedioic acid, 1,12-dodecanedioic acid and 1,16-hexadecanedioic acid, and/or
- (a1.4) one or more lactams or w-amino acids, selected from the group consisting of lactam-6, lactam-12, 1,6-aminohexanoic and 1,12-aminododecanoic acid.

According to a more preferred embodiment of the present invention, the at least one partially crystalline, partially aromatic polyamide (A1) is formed from the monomers (a1.1) to (a1.2) and optionally (a1.3):
- (a1.1) at least one diamine, selected from the group consisting of 1,6-hexanediamine, 1,10-dodecanediamine and bis(aminomethyl)cyclohexane, and
- (a1.2) at least one aromatic dicarboxylic acid, selected from the group consisting of terephthalic acid and isophthalic acid, and/or
- (a1.3) at least one dicarboxylic acid, selected from the group consisting of 1,6-hexanedioic acid, 1.10-decanedioic acid and 1,12-dodecanedioic acid, According to a further preferred embodiment of the present invention, the at least one partially crystalline, partially aromatic polyamide (A1) comprises:
at least 10 mol %, preferably at least 20 mol %, more preferably at least 25 mol % 1,6-hexanediamine, and at least 10 mol %, preferably at least 20 mol %, more preferably at least 25 mol % terephthalic acid.

According to a further preferred embodiment of the present invention, the at least one partially crystalline, partially aromatic polyamide (A1) is selected from the group consisting of:
PA 4T/66, PA 4T/6T, PA 4T/8T, PA 6T/8T, PA 4T/MPMDT, PA 4T/6T/MPMDT, PA 4T/4I, PA 4T/6I, PA 5T/5I, PA 6T/MPMDT, PA 6T/MPMDT/6I, PA 6T/6I, PA 6T/66, PA 6T/6, PA 6T/12, PA 6T/66/6, PA 6T/610, PA 6T/612, PA 6T/10I, PA 6T/9T, PA 6T/12T, PA 6T/6I/6, PA 6T/6I/66, PA 6T/6I/612, PA 6T/6I/12, PA 9T/MODT, PA 9T/9I, PA 10T, PA 12T, PA 12T/12I, PA 10T/1012, PA 10T/6T, PA 10T/10I, PA10T/106, PA10T/12, PA10T/11, PA 10T/6T/612, PA 10T/6T/10I/6I, PA 10T/6T/1012/612, PA 6T/BACT, PA 6T/BACT/66, PA 6T/6I/BACT/BACI, PA 6T/BACT/MACMT, PA 6T/BACT/PACMT, PA 6T/BACT/TMDCT, PA 4T/6T/8T, PA 4T/6T/10T, PA 4T/8T/10T, PA 6T/8T/10T and copolyamides thereof,
more preferably selected from the group consisting of PA 6T/MPMDT, PA 6T/6I, PA 6T/66, PA 6T/6, PA 6T/12, PA 6T/66/6, PA 6T/6I/6, PA 6T/6I/66, PA 6T/6I/612, PA 9T/MODT, PA 10T, PA 12T, PA 10T/1012, PA 10T/6T, PA 10T/10I, PA 10T/6T/612, PA 10T/6T/10I/6I, PA 10T/6T/1012/612, PA 6T/BACT, PA 6T/BACT/66, PA 6T/BACT/MACMT and PA 6T/BACT/PACMT,
even more preferably selected from the group consisting of PA 6T/6I, PA 6T/66, PA 6T/66/6, PA 6T/6I/66, PA 6T/6I/612, PA 10T/1012, PA 10T/6T, PA 10T/6T/612, PA 10T/6T/10I/6I, PA 10T/6T/1012/612, PA 6T/BACT and PA 6T/BACT/66.

According to a further preferred embodiment of the present invention, the at least one partially crystalline, partially aromatic polyamide (A1) is free from lactams and ω-amino acids.

According to a further preferred embodiment of the present invention, the partially crystalline, partially aromatic polyamide (A1) PA 6T/66, formed from:
50 mol % 1,6-hexanediamine,
14 to 40 mol %, preferably 20 to 35 mol %, more preferably 25 to 30 mol % terephthalic acid, and
10 to 36 mol %, preferably 15 to 30 mol %, more preferably 20 to 25 mol % 1,6-hexanoic acid.

Component (A2)

The caprolactam-containing polyamide (A2) preferably consists to an extent of at least 60 wt. %, more preferably to an extent of at least 70 wt. %, even more preferably to an extent of at least 80 wt. % of caprolactam.

Should the component (A2) be a copolymer, preferred comonomers for (A2) which are used besides caprolactam are, on the one hand, combinations of diamines and dicarboxylic acids which are used preferably in equimolar or almost equimolar amounts, and, on the other hand, lactams and aminocarboxylic acids.

Suitable diamines are in particular branched or linear aliphatic diamines with 4 to 18 C atoms. Suitable dicarboxylic acids with 6 to 36 carbon atoms are in particular aliphatic, cycloaliphatic or aromatic dicarboxylic acids.

According to a preferred embodiment, the C4-C18 diamine is at least one diamine selected from the group consisting of:
1,4-butanediamine, 1,5-pentanediamine, 2-methylpentanediamine, 1,6-hexanediamine, 1,7-heptanediamine 1,8-octanediamine, 1,9-nonanediamine, methyl-1,8-octanediamine, 2,2,4-trimethylhexanediamine, 2,4,4-trimethylhexanediamine, 1,10-decanediamine, 1,11- undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamime, bis(4-amino-cyclohexyl)methane, 2,2-(4,4'-diaminodicyclohexyl)propane, bis(4-amino-3-methyl-cyclohexyl)methane, m-xylylenediamine and p-xylylenediamine, preferably 1,6-hexanediamine, 1,10-decanediamine and 1,12-dodecanediamine, more preferably 1,6-hexanediamine and 1,10-decanediamine.

According to a more preferred embodiment, the C4-C18 diamine is 1,6-hexanediamine.

According to a preferred embodiment, the C4-C18 diamine is at least one diamine selected from the group consisting of:

1,6-hexanedioic acid, 1,8-octanedioic acid, 1,9-nonanedioic acid, 1,10-decanedioic acid, 1,11-undecanoic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, cyclohexanedicarboxylic acid, dimer fatty acids with 36 or 44 C atoms, terephthalic acid, isophthalic acid and naphthalenedicarboxylic acid, preferably 1,6-hexanedioic acid, 1,10-decanedioic acid, 1,11-undecanoic acid, 1,12-dodecanedioic acid, terephthalic acid and isophthalic acid, more preferably 1,6-hexanedioic acid and terephthalic acid.

According to a more preferred embodiment of the invention, the dicarboxylic acid is adipic acid.

Further preferred comonomers for the polyamide (A2) are lactams or amino carboxylic acids with 7 to 12 carbon atoms, wherein lactam-12 and/or 1,12-aminododecanoic acid are more preferred.

In a further more preferred embodiment of the invention, the at least one caprolactam-containing polyamide (A2) is selected from the group consisting of:

PA 6, PA 6/12, PA 6/6T, PA 6/6I, PA 6/66, PA 6/610, PA 6/612, PA 6/616, PA 6/10T, PA 6/10I, PA 6/106, PA 6/1010, PA 6/1012, PA 6/1016, PA 6/611, PA 6/1011, PA 6/126, PA 6/12T, PA 6/12I, PA 6/1210, PA 6/1212, PA 6/1216, PA 6/66/69, PA 6/66/610, PA 6/66/6T, PA 6/66/6I, PA 6/66/612, PA 6/66/616, PA 6/6T/69, PA 6/6T/610, PA 6/6T/6I, PA 6/6T/612, PA 6/6T/616, PA 6/6I/69, PA 6/6I/610, PA 6/6I/612, PA 6/6I/616 and copolyamides thereof, more preferably PA 6, PA 6/12, PA 6/6T, PA 6/6I, PA 6/66, PA 6/610, PA 6/612, PA 6/616, PA 6/10T, PA 6/10I, PA 6/106, PA 6/1010, PA 6/1012, PA 6/1016, PA 6/611, PA 6/1011, PA 6/126, PA 6/12T, PA 6/12I, PA 6/1210, PA 6/1212 and PA 6/1216, even more preferably PA 6, PA 6/12, PA 6/6T, PA 6/6I, PA 6/66, PA 6/610, PA 6/612, PA 6/616, PA 6/10T and PA 6/10I.

The caprolactam-containing polyamides (A2) are even more preferably partially crystalline, aliphatic polyamides.

The caprolactam-containing polyamide (A2) preferably has a relative viscosity (RV), measured according to EN ISO 307 (2007) in the range of 1.6 to 3.0, more preferably in the range of 1.7 to 2.5, very particularly even more preferably in the range of 1.8 to 2.2.

Component (B)

The term "fillers" (component (B)) comprises fibrous fillers, needle-shaped fillers, particulate fillers and mixtures thereof.

The fillers can preferably be coated or surface-treated, that is, they can be provided with a suitable sizing or adhesion promoter system or be surface-activated in another manner. For this purpose, for example, it is possible to use systems based on urethanes, silanes, epoxies, polyamides, polyhydroxy ethers, acrylates, or combinations or mixtures thereof. The sizing or adhesion promoter systems can also include other auxiliary substances such as antistatic agents or lubricants.

The fibrous or needle-shaped fillers are preferably selected from the group consisting of glass fibers, carbon fibers, basalt fibers, boron fibers, slag fibers, metal fibers, whiskers, mineral fibers, wollastonite, aramid fibers, ground glass fibers, ground carbon fibers, ground mineral fibers, and mixtures thereof.

The fibrous or needle-shaped fillers are more preferably selected from the group consisting of glass fibers, carbon fibers, basalt fibers, boron fibers, aramid fibers, and mixtures thereof.

Even more preferably, glass fibers are exclusively used as fibrous or needle-shaped fillers.

In terms of the glass or carbon fibers, it is possible to use staple fibers or continuous filaments (rovings).

The cross-section of the glass or carbon fibers is circular (round), oval, elliptical, elliptical with constriction(s) (so-called cocoon fibers), angular or rectangular. Fibres with a non-circular cross-section, in particular oval or elliptical fibres, elliptical fibres with narrowed portion(s) (what are known as cocoon fibres), and angled or right-angled fibres are also referred to as flat fibres. Mixtures of circular and non-circular fibres can also be used.

The appearance of the glass fibers can be elongated or spiral-shaped.

It is possible to use glass fibers made of all glass types, such as A-, C-, D-, E-, ECR-, L-, LD-, M-, NE-, S-, R-, AR-glass, or arbitrary mixtures thereof. Preferred are glass fibers made of E-glass, S-glass or mixtures comprising E- and/or S-glass fibers.

The staple glass fibers have a fiber length of 1 to 50 mm, especially of 1 to 25 mm, preferably 1.5 to 20 mm, more preferably 2 to 12 mm, and even more preferably of 2 to 8 mm.

The glass fibers especially have a diameter of 5 to 20 μm, preferably of 5 to 15 μm, and more preferably of 6 to 12 μm.

If the glass fibers are used as continuous filaments (rovings) in a pultrusion process, these preferably have a diameter of no more than 20 μm, preferably of no more than 18 μm, and more preferably of 10 to 17 μm.

The carbon fibers especially have a diameter of 3 to 12 μm, preferably 4 to 10 μm, and more preferably 4 to 9 μm.

In the flat fibers, the aspect ratio, that is, the ratio of the major cross-sectional axis to the minor cross-sectional axis, is 1.5 to 8, preferably 2 to 6, more preferably 2.5 to 5, and even more preferably 3 to 4.

Among the flat fibers, flat glass fibers are more preferred.

The cross-sectional axes of the flat glass fibers are 3 to 40 μm long. The length of the minor cross-sectional axis is preferably 3 to 20 μm, particularly preferably 4 to 10μ, and the length of the major cross-sectional axis is 6 to 40 μm, more preferably 12 to 30 μm.

The particulate fillers are preferably selected from the group consisting of dolomite, silicates, quartz, talc, mica, kaolin, perlite, silica, precipitated or fumed silicas, diatomaceous earth, titanium dioxide, magnesium carbonate, magnesium hydroxide, aluminum hydroxide, ground or precipitated calcium carbonate, zinc oxide, zinc sulphide, chalk, lime, limestone powder, slate powder, feldspar, barium carbonate, barium sulphate, synthetic phyllosilicates, natural phyllosilicates, permanent-magnetic or magnetizable metals or alloys, glass flakes, glass spheres, hollow glass spheres, hollow-sphere silicate fillers, and mixtures thereof.

The particulate fillers are more preferably selected from the group consisting of silicates, quartz, talc, mica, kaolin, perlite, silica, precipitated or fumed silica, diatomaceous earth, titanium dioxide, magnesium carbonate, magnesium hydroxide, aluminum hydroxide, ground or precipitated calcium carbonate, chalk, lime, lime stone powder, slate powder, feldspar, barium carbonate, barium sulfate, synthetic phyllosilicates, natural phyllosilicates, glass flakes, glass spheres, hollow glass spheres, hollow silica sphere fillers, and mixtures thereof.

The particulate fillers are even more preferably selected from the group consisting of silicates, talc, mica, kaolin, titanium dioxide, ground or precipitated calcium carbonate, chalk, limestone powder, slate powder, synthetic phyllosilicates, natural phyllosilicates, glass flakes, glass spheres, hollow glass spheres, and mixtures thereof.

At least one fibrous and/or needle-shaped filler or a mixture of at least one fibrous and/or needle-shaped filler with at least one particulate filler is preferably used as filler (component (B)) in the polyamide moulding compound according to the invention.

If a mixture of at least one fibrous and/or needle-shaped filler with at least one particulate filler is used, the proportion of the particulate filler accounts for at most half, preferably at most a third, more preferably at most a quarter of the total quantity of the filler.

It is more preferred if a mixture of at least one fibrous and/or needle-shaped filler with at least one particulate filler is used as filler in the polyamide moulding compound according to the invention in a weight ratio of 98:2 to 100:0.

A mixture of at least one fibrous filler with at least one particulate filler is more preferably used as filler in the polyamide moulding compound according to the invention in a weight ratio of 98:2 to 100:0.

Component (C)

According to a preferred embodiment, the at least one substituted or unsubstituted metallocene has a melting temperature of 120° C. to 350° C., preferably 140° C. to 320° C., more preferably 150 to 280° C.

According to a preferred embodiment, the at least one substituted or unsubstituted metallocene has, as central metal atom, a metal from group 3 to 12 or the lanthanoids, preferably vanadium, chromium, manganese, iron, cobalt, nickel, ruthenium, osmium, zinc, rhodium, cadmium, iridium, magnesium, lanthanum, cerium, samarium, zirconium, scandium, yttrium and combinations thereof, more preferably unsubstituted or substituted bis($\eta^5$-cyclopentadienyl)iron, in particular selected from the group consisting of ferrocene, 3-carboxybutyrylferrocene, 3-carboxypropionylferrocene, 6-mercaptohexylferrocene, aminomethylferrocene, dimethylaminomethylferrocene, diphenylphosphinoferrocene, 1-ferroceneacrylonitrile, 1-ferrocenylethanol, 1,1'-bis(1-hydroxyethyl)ferrocene, 1,1'-diacetylferrocene, 1,1'-diaminoferrocene, 1,1'-dibenzoylferrocene, 1,1'-dibutylferrocene, 1,1'-diethylferrocene, 1,1'-dihexylferrocene, 1,1'-dimethylferrocene, 1,1'-divinyl-ferrocene, 1,1'-ferrocenedicarboxaldehyde, 1,1'-ferrocenedicarboxamide, 1,1'-ferrocenedicarboxylic acid, 1,1'-ferrocenedimethanol, 1,1'-ferrocenyl acetic acid, 1,1'-ferrocenylpropanoic acid, 1,1'-ferrocenylbutanoic acid, 1,1'-ferrocenylpentanoic acid, 1,2,3,4,5-pentamethylferrocene, 2-ferrocenylethanol, 3-ferrocenylpropanol, 3-ferrocenylpropanoic acid, 4-ferrocenylbutanoic acid, 5-ferrocenylpentanoic acid, acetylferrocene, α-(N,N-dimethylamino)ethylferrocene, aminoferrocene, ethylferrocene, ferrocenyl acetic acid, ferrocenylmethanol, octylferrocene, ferrocenecarboxyic acid, ferrocenecarboxamide, ferrocenecarboxaldehyde, propylferrocene, hexylferrocene, hydroxyethylferrocene, benzoylferrocene, butylferrocene, methylferrocene, vinylferrocene and bis(pentamethyl-cyclopentadienyl)iron(II).

Bis($\eta^5$-cyclopentadienyl)iron is also referred to as ferrocene (CAS no. 102-54-5). Both names are used synonymously in this application.

The substituted metallocene can be substituted once or more at one or both cyclopentadienyl rings. In the event that both cyclopentadienyl rings are substituted, this can be the same or different substituents, preferably the same substituents. Each cyclopentadienyl ring is preferably substituted only once. More preferably, just one of the two cyclopentadienyl rings is substituted. More preferably, just one of the two cyclopentadienyl rings is substituted once.

The substituents are preferably selected from the group consisting of alkyl, alkylene, and arylene groups, groups of carboxylic acids, carboxylic acid derivatives, oxoalkanoic acids, alcohols, amines and groups of phosphorus-containing substituents.

The substituents are preferably selected from the group consisting of alkyl groups with 1 to 12 C atoms, alkylene groups with 2 to 12 C atoms, aryl groups with 6 to 12 C atoms, groups of carboxylic acids with 1 to 12 C atoms, carboxylic acid esters with 2 to 20 C atoms, carboxylic acid anhydrides with 2 to 12 C atoms, oxoalkanoic acids with 1 to 12 C atoms, alcohols with 1 to 12 C atoms, amines with 0 to 12 C atoms, and groups of phosphorus-containing substituents.

The substituents are more preferably selected from the group consisting of alkyl groups with 1 to 9 C atoms, alkylene groups with 2 to 9 C atoms, aryl groups with 6 to 9 C atoms, groups of carboxylic acids with 1 to 9 C atoms, carboxylic acid esters with 2 to 18 C atoms, carboxylic acid anhydrides with 2 to 9 C atoms, oxoalkanoic acids with 1 to 9 C atoms, alcohols with 1 to 9 C atoms, amines with 0 to 9 C atoms, and groups of phosphorus-containing substituents.

The substituents are even more preferably selected from the group consisting of alkyl groups with 1 to 6 C atoms, alkylene groups with 2 to 6 C atoms, aryl groups with 6 to 7 C atoms, groups of carboxylic acids with 1 to 6 C atoms, carboxylic acid esters with 2 to 14 C atoms, carboxylic acid anhydrides with 2 to 6 C atoms, oxoalkanoic acids with 1 to 6 C atoms, alcohols with 1 to 6 C atoms, amines with 0 to 6 C atoms, and groups of phosphorus-containing substituents.

According to a preferred embodiment of the present invention, the at least one unsubstituted or substituted metallocene bis($\eta^5$-cyclopentadienyl)iron is selected from the group consisting of ferrocene, 3-carboxybutyrylferrocene, 3-carboxypropionylferrocene, 6-mercaptohexylferrocene, aminomethylferrocene, dimethylaminomethylferrocene, diphenylphosphinoferrocene, 1-ferroceneacrylonitrile, 1-ferrocenylethanol, 1,1'-bis(1-hydroxy-ethyl)ferrocene, 1,1'-diacetylferrocene, 1,1'-diamino-ferrocene, 1,1'-dibenzoylferrocene, 1,1'-dibutylferrocene, 1,1'-diethylferrocene, 1,1'-dihexylferrocene, 1,1'-dimethylferrocene, 1,1'-divinylferrocene, 1,1'-ferrocenedicarboxaldehyde, 1,1'-ferrocenedicarboxamide, 1,1'-ferrocenedicarboxylic acid, 1,1'-ferrocenedimethanol, 1,1'-ferrocenyl acetic acid, 1,1'- ferrocenylpropanoic acid, 1,1'-ferrocenylbutanoic acid, 1,1'-ferrocenylpentanoic acid, 1,2,3,4,5-pentamethylferrocene, 2-ferrocenylethanol, 3-ferrocenylpropanol, 3-ferrocenylpropanoic acid, 4-ferrocenylbutanoic acid, 5-ferrocenylpentanoic acid, acetylferrocene, α-(N,N-dimethylamino)ethylferrocene, aminoferrocene, ethylferrocene, ferrocenyl acetic acid, ferrocenylmethanol, octylferrocene, ferrocenecarboxylic acid, ferrocenecarboxamide, ferrocenecarboxaldehyde, propylferrocene, hexylferrocene, hydroxyethylferrocene, benzoylferrocene, butylferrocene, methylferrocene, vinylferrocene and bis(pentamethylcyclopentadienyl)iron(II).

According to a more preferred embodiment of the present invention, the at least one unsubstituted or substituted metallocene bis($\eta^5$-cyclopentadienyl)iron is selected from the group consisting of ferrocene, aminoferrocene, 1,1'-diaminoferrocene, ferrocene carboxylic acid, 1,1'-ferrocene dicarboxylic acid, aminomethylferrocene, 1,1'-bis(aminomethyl)ferrocene, dimethylaminomethylferrocene, 1,1'-bis(dimethylaminomethyl)ferrocene, ferrocenyl acetic acid, 1,1'-ferrocenyl acetic acid, ferrocenylmethanol, 1,1'-ferrocenedimethanol, ferrocenecarboxaldehyde, 1,1'-ferrocenedicarboxaldehyde, acetylferrocene, 1,1'-diacetylferrocene, methylferrocene and 1,1'-dimethylferrocene.

According to a further more preferred embodiment of the present invention, the at least one unsubstituted or substituted metallocene bis($\eta^5$-cyclopentadienyl)iron is selected from the group consisting of ferrocene, aminoferrocene, 1,1'-diaminoferrocene, ferrocene carboxylic acid, 1,1'-ferrocene dicarboxylic acid, aminomethylferrocene, 1,1'-bis(aminomethyl)ferrocene, ferrocenyl acetic acid and 1,1'-ferrocenyl acetic acid.

According to an even more preferred embodiment of the present invention, the at least one unsubstituted or substituted metallocene bis($\eta^5$-cyclopentadienyl)iron is ferrocene.

Component (D)

According to a preferred embodiment of the present invention, the at least one additive (component (D)) is selected from the group consisting of inorganic stabilisers, organic stabilisers, in particular antioxidants, antiozonants, light stabilisers, UV stabilisers, UV absorbers or UV blockers, IR absorbers, NIR absorbers, anti-block agents, nucleation agents, crystallisation accelerators, crystallisation retardants, chain-extending additives, conductivity additives, separating agents, lubricants, dyes, markers, inorganic pigments, organic pigments, carbon black, graphite, carbon nanotubes, graphene, titanium dioxide, zinc sulphide, zinc oxide, barium carbonate, barium sulphate, photochromic agents, antistatic agents, release agents, optical brighteners, halogen-free flame retardants, metallic pigments, metal flakes, metal-coated particles and mixtures thereof, different from component (C).

In a more preferred embodiment of the present invention, the at least one additive (component (D)) is selected from the group consisting of organic stabilisers, in particular antioxidants, antiozonants, light stabilisers, UV stabilisers, UV absorbers or UV blockers, IR absorbers, NIR absorbers, anti-block agents, nucleation agents, crystallisation accelerators, crystallisation retardants, chain-extending additives, conductivity additives, separating agents, lubricants, dyes, markers, inorganic pigments, organic pigments, carbon black, graphite, carbon nanotubes, graphene, photochromic agents, antistatic agents, release agents, optical brighteners, halogen-free flame retardants, metallic pigments, metal flakes, metal-coated particles and mixtures thereof.

Among the organic stabilisers, phenol compounds, phosphite compounds, phosphonite compounds, hindered amine-based stabilisers (HALS) or mixtures thereof are more preferred.

The at least one additive can also be added in master batch form. A polyamide or polyolefin is preferably used as base polymer. The polyamide is preferably selected from the group consisting of PA 6, PA 66, PA 6/12, PA 6/66, PA 6/69, PA 12, PA 1012, PA 1212 and mixtures thereof or consists of the polyamide (A1) or (A2) or the polyamide mixture (A).

Moulded Articles

In accordance with the invention, moulded articles are also provided which are producible from the previously described moulding compounds or comprise the latter. The moulded articles according to the invention can be produced from the polyamide moulding compound according to the invention by means o the conventional processing techniques, such an injection moulding, extrusion or blow moulding, in particular by injection moulding. These are preferably moulded articles from the automotive field, in particular in the engine compartment, or from the fields of electrical engineering, electronics, mechanical engineering, energy production and energy supply.

A preferred embodiment provides that the moulded article is selected from the group consisting of cylinder head covers, engine covers, housings and parts for intercoolers, intercooler valves, intake pipes, in particular intake manifolds, exhaust gas lines, connectors, gearwheels, fan impellers, cooling water tanks, housings or parts of heat exchangers, coolant coolers, thermostats, water pumps, heating elements, fastening parts, printed circuit boards, films, lines, housings and parts of electrical/electronic devices, housings and parts of heater fans, switches, distributors, relays, resistors, capacitors, coils, lamps, diodes, LEDs, transistors, connectors, controllers, storage devices and sensors.

Uses

The present invention further relates to the use of the above-defined polyamide moulding compound according to the invention for producing parts or components for the automotive field, in particular in the engine compartment, or for the fields of electrical engineering, electronics, mechanical engineering, energy production and energy supply, such as cylinder head covers, engine covers, housings and parts for intercoolers, intercooler valves, intake pipes, in particular intake manifolds, exhaust gas lines, connectors, gearwheels, fan impellers, cooling water tanks, housings or parts of heat exchangers, coolant coolers, thermostats, water pumps, heating elements, fastening parts, printed circuit boards, films, lines, housings and parts of electrical/electronic devices, housings and parts of heater fans, switches, distributors, relays, resistors, capacitors, coils, lamps, diodes, LEDs, transistors, connectors, controllers, storage devices and sensors.

Measurement Methods, Storage Conditions and Production of the Test Specimens

Relative Viscosity:

The relative viscosity was determined according to ISO 307 (2007) at 20° C. For this purpose, 0.5 g polymer granules was weighed into 100 ml m-cresol, and the calculation of the relative viscosity (RV) according to $RV=t/t_0$ was carried out based on Section 11 of the standard.

Melting Temperature and Heat of Fusion:

The determination was performed in accordance with ISO 11357-3 (2013) on granular material.

The differential scanning calorimetry (DSC) was carried out for each of the two heating processes with a heating rate of 20 K/min. Following the first heating, cooling was performed at a rate of 20 K/min. The melting temperature and the heat of fusion were determined during a second heating. The temperature at the peak maximum is specified as the melting temperature.

Tear Strength and Elongation at Break:

The determination was performed in accordance with ISO 527 at a tension rate of 5 mm/min at a temperature of 23° C. ISO tension rods (type A1, mass 170×20/10×4) stored at elevated temperature and then stored were used as test specimens, produced according to standard: ISO/CD 3167 (2003). For cooling, the ISO tension rods were stored before the tension test for at least 48 h at room temperature in a dry environment, i.e. over silica gel.

Storage Conditions:

Storage was performed in a drying cabinet at 180° C., 200° C. and 220° C.

Sampling was performed from all stores at the same moments in time, specifically after 504 h, 1008 h, 1512 h and 2016 h. 5 ISO tension rods (type A1, mass 170×20/10×4, produced according to standard: ISO/CD 3167 (2003)) are stored per material storage time and storage temperature, and the arithmetic mean of the 5 measured values is formed.

Spiral Flow Test:

The flow spirals were produced on an injection moulding machine from Arburg, model Allrounder 420 C 100-250 at a material temperature of 330° C. and a mould temperature of 80° C. with an injection pressure of 1000 bar.

The flow spiral has its sprue in the centre and a cross-section of 1.5×10 mm. The following removal marks are arranged in the spiral:
  points at a distance of 1 mm
  stripes at full centimetres
  length specifications every 5 cm Production of the test specimens:

To produce the ISO tension rods, granular material with a water content of less than 0.1 wt. % was used.

The ISO tension rods were manufactured on an injection moulding machine from Arburg, model Allrounder 420 C 1000-250. Cylinder temperatures that increase and decrease from the feed to the nozzle were used.

Cylinder temperatures: 310 to 340° C.
Mould temperature: 120° C.

The test specimens, unless stated otherwise, were used in the dry state; to this end, they are stored after the injection moulding for at least 48 h at room temperature in a dry environment, i.e. over silica gel.

General Production Instructions for the Polyamide Moulding Compounds According to the Invention To produce the polyamide moulding compounds according to the invention, the components (A1), (B), (C) and optionally (A2) and optionally (D) were mixed on conventional compounding machines, such as a single- or twin-shaft extruders or screw compounders. The components in this case are metered individually via gravimetric or volumetric metering scales into the feed or into a sidefeeder or are supplied in the form of a dry blend.

If additives (component (D)) are used, they can be introduced directly or in the form of a masterbatch. The carrier material of the masterbatch is preferably a polyamide or a polyolefin. The polyamide is preferably selected from the group consisting of PA 6, PA 66, PA 6/12, PA 6/66, PA 6/69, PA 12, PA 1012, PA 1212 and mixtures thereof or consists of the polyamide (A1) or (A2) or the polyamide mixture (A).

To produce a dry blend, the dried granular material of the polyamide (A1), the component (C) and optionally the dried granular material of the polyamide (A2) and optionally the additives (D) are mixed in a closed container. This mixture is homogenised by means of a tumble mixer, drum hoop mixer or tumbling dryer for 10 to 40 minutes. To avoid moisture absorption, the mixing can be performed under dried inert gas.

The compounding is performed at set cylinder temperatures of 300 to 380° C., wherein the temperature of the first cylinder can be set to 50 to 100° C. Degassing can occur before the nozzle. This can be performed by means of vacuum or atmospherically. The melt is discharged in the form of a strand, is cooled in a water bath at 10 to 80° C., and is then granulated. Alternatively, the melt can also be pressed into a water bath by a perforated plate with cutting device, and the cut granular material can be separated off in a post-treatment section (underwater granulation). The granular material is dried at a maximum of 100° C. under nitrogen or in a vacuum to a water content of less than 0.1 wt. %.

The subject matter according to the invention will be explained in greater detail on the basis of the following examples, without wishing to be limited to the specific embodiments shown here.

EXAMPLES AND COMPARISON EXAMPLES

Starting materials

The materials used in the examples and comparison examples are summarized in Table 1.

TABLE 1

| Materials used in the examples and comparison examples | | |
|---|---|---|
| Components | Description | Manufacturer |
| Polyamide 6T/66 (A1.1) | Partially crystalline polyamide made of 1,6-hexanediamine (50 mol %), terephthalic acid (27.5 mol %) and adipic acid (22.5 mol %) RV 1.69 (measured with 0.5 g in 100 ml m-cresol at 20° C.) Melting temperature 310° C. Heat of fusion 60 J/g | EMS-CHEMIE AG, Switzerland |
| Polyamide 6T/6I (A1.2) | Partially crystalline polyamide made of 1,6-hexanediamine (50 mol %), terephthalic acid (35 mol %) and isophthalic acid (15 mol %) RV 1.58 (measured with 0.5 g in 100 ml m-cresol at 20° C.) Melting temperature 325° C. Heat of fusion 45 J/g | EMS-CHEMIE AG, Switzerland |

TABLE 1-continued

Materials used in the examples and comparison examples

| Components | Description | Manufacturer |
|---|---|---|
| Polyamide 6 (A2) | Polyamide 6 from ε-caprolactam RV 1.80 (measured with 0.5 g in 100 ml m-cresol at 20° C.) Melting temperature 222° C. | EMS-CHEMIE AG, Switzerland |
| Glass fibres (B1) | round glass fibres, 4.5 mm long Diameter 10 μm Trade name: OCV 995 EC10-4.5 | Owens Corning Vetrotex, France |
| Kaolin (B2) | CAS no. 1332-58-7 Trade name: Translink 445 | BASF SE, Germany |
| Ferrocene (C) | Bis(η5-cyclopentadienyl)iron, CAS no. 102-54-5 Trade name: Plutocen F-C | Innospec Deutschland GmbH, Germany |
| Black Masterbatch (D1) | 25 wt. % carbon black in Radipol A45 (PA66) | RadiciChimica SpA, Italy |
| KI: Ca stearate 98: 2 wt. % (D2) | Mixture of potassium iodide (CAS no. 7681-11-0) and calcium stearate (CAS no. 1592-23-0) in the weight ratio 98:2 Trade name: Adnol TS P stab | Liquichem Handelsgesellschaft mbH, Germany |
| CuI (D3) | Copper iodide, CAS no. 7681-65-4 | Liquichem Handelsgesellschaft mbH, Germany |

RV relative viscosity, measured at a solution of 0.5 g polyamide in 100 ml m-cresol at 20° C.

Production of the polyamide moulding compound according to Example 2

The dried granular material of the polyamide (A1.1) and (A2), the filler (B2), the ferrocene (C) and the additive (D1) were mixed to a dry blend, specifically in the ratio specified in Table 2. This mixture was homogenised by means of a tumble mixer for approximately 20 minutes.

The polyamide moulding compound was produced on a twin-screw extruder from Werner & Pfleiderer, type ZSK 25. The dry blend was metered into the feed by means of metering scales. The glass fibres (B1) were conveyed into the melt by means of metering scales and a sidefeeder 6 housing zones before the nozzle.

The temperature of the first housing was set to 50° C., that of the rest of the housing to 305 to 330° C. A rotational speed of 150 rpm and a throughput of 15 kg/h were used. No degassing was performed. The melt strand was cooled in a water bath, cut, and the obtained granular material was dried at 100° C. for 24 h under vacuum (30 mbar) to a water content of less than 0.1 wt. %.

The results of the examples and comparison examples according to the present invention are summarized in the following Tables 2 to 4.

TABLE 2

Tests without PA 6, tear strength in MPa and in % of the starting value

| | | Examples | | Comparison example | Example | Comparison Example |
|---|---|---|---|---|---|---|
| Component | Unit | 1 | 2 | 3 | 4 | 5 |
| PA 6T/66 (A1.1) | wt. % | 49.94 | 50.7 | 50.6 | 37.3 | 37.3 |
| PA 6 (A2) | wt. % | 16.8 | 16.8 | 16.8 | 15.24 | 15.24 |
| Kaolin (B2) | wt. % | 0.26 | 0.26 | 0.26 | 0.22 | 0.22 |
| KI: Ca stearate 98: 2 wt. % (D2) | wt. % | — | — | 0.3 | — | 0.2 |
| CuI (D3) | wt. % | — | — | 0.04 | — | 0.03 |
| Ferrocene (C) | wt. % | 1.0 | 0.24 | — | 0.24 | — |
| Black Masterbatch (D1) | wt. % | 2.0 | 2.0 | 2.0 | 2.0 | 2.0 |
| Glass fibres (B1) | wt. % | 30 | 30 | 30 | 45 | 45 |

| | | Tear strength | | | | | | | | |
|---|---|---|---|---|---|---|---|---|---|---|
| Storage period | — | MPa | % | MPa | % | MPa | % | MPa | % | MPa | % |
| 0 | h | 189 | 100 | 206 | 100 | 197 | 100 | 240 | 100 | 238 | 100 |
| Storage temperature 180° C. | | | | | | | | | | | |
| 504 | h | 205 | 108 | 219 | 106 | 179 | 91 | 256 | 107 | 232 | 98 |
| 1008 | h | 205 | 108 | 205 | 100 | 159 | 81 | 244 | 102 | 204 | 86 |
| 1512 | h | 200 | 106 | 201 | 98 | 148 | 75 | 241 | 100 | 195 | 82 |
| 2016 | h | 193 | 102 | 200 | 97 | 147 | 75 | 254 | 106 | 192 | 81 |
| 3024 | h | 130 | 69 | 197 | 96 | 102 | 54 | 233 | 97 | 187 | 77 |

TABLE 2-continued

Tests without PA 6, tear strength in MPa and in % of the starting value

| | | Storage temperature 200° C. | | | | | | | | |
|---|---|---|---|---|---|---|---|---|---|---|
| 504 | h | 198 | 105 | — | — | 160 | 81 | — | — | — | — |
| 1008 | h | 197 | 104 | — | — | 164 | 83 | — | — | — | — |
| 1512 | h | 194 | 103 | — | — | 158 | 80 | — | — | — | — |
| 2016 | h | 189 | 100 | — | — | 159 | 81 | — | — | — | — |
| 3024 | h | 171 | 90 | — | — | 146 | 77 | — | — | — | — |
| | | Storage temperature 220° C. | | | | | | | | |
| 504 | h | 197 | 104 | 204 | 99 | 174 | 88 | 251 | 105 | 231 | 97 |
| 1008 | h | 201 | 106 | 193 | 94 | 179 | 91 | 231 | 96 | 222 | 93 |
| 1512 | h | 206 | 109 | 197 | 97 | 173 | 88 | 242 | 101 | 182 | 76 |
| 2016 | h | 195 | 103 | 206 | 100 | 163 | 83 | 248 | 103 | 95 | 40 |
| 3024 | h | 172 | 91 | 206 | 100 | 157 | 83 | 224 | 93 | 16 | 7 |

TABLE 3

Tests with PA 6, Elongation at break in %

| Component | Unit | Examples | | Comparison example | Example | Comparison Example |
|---|---|---|---|---|---|---|
| | | 1 | 2 | 3 | 4 | 5 |
| PA 6T/66 (A1.1) | wt. % | 49.94 | 50.7 | 50.6 | 37.3 | 37.3 |
| PA 6 (A2) | wt. % | 16.8 | 16.8 | 16.8 | 15.24 | 15.25 |
| Kaolin (B2) | wt. % | 0.26 | 0.26 | 0.26 | 0.22 | 0.22 |
| KI: Ca stearate 98: 2 wt. % (D2) | wt. % | — | — | 0.3 | — | 0.2 |
| CuI (D3) | wt. % | — | — | 0.04 | — | 0.03 |
| Ferrocene (C) | wt. % | 1.0 | 0.24 | — | 0.24 | — |
| Black Masterbatch (D1) | wt. % | 2.0 | 2.0 | 2.0 | 2.0 | 2.0 |
| Glass fibres (B1) | wt. % | 30 | 30 | 30 | 45 | 45 |

| | | Elongation at break | | | | |
|---|---|---|---|---|---|---|
| Storage period | — | % | % | % | % | % |
| 0 | h | 2.5 | 2.7 | 2.5 | 2.5 | 2.4 |
| | | Storage temperature 180° C. | | | | |
| 504 | h | 2.8 | 3.0 | 2.0 | 2.7 | 2.1 |
| 1008 | h | 2.8 | 2.6 | 1.7 | 2.4 | 1.6 |
| 1512 | h | 2.7 | 2.5 | 1.5 | 2.4 | 1.5 |
| 2016 | h | 2.5 | 2.5 | 1.5 | 2.6 | 1.5 |
| 3024 | h | 2.0 | — | 1.5 | — | — |
| | | Storage temperature 200° C. | | | | |
| 504 | h | 2.5 | — | 1.7 | — | — |
| 1008 | h | 2.6 | — | 1.7 | — | — |
| 1512 | h | 2.6 | — | 1.7 | — | — |
| 2016 | h | 2.4 | — | 1.7 | — | — |
| 3024 | h | 2.0 | — | 1.5 | — | — |
| | | Storage temperature 220° C. | | | | |
| 504 | h | 2.5 | 2.6 | 1.9 | 2.8 | 2.0 |
| 1008 | h | 2.7 | 2.2 | 2.0 | 1.9 | 1.9 |
| 1512 | h | 2.8 | 2.3 | 1.9 | 2.2 | 1.4 |
| 2016 | h | 2.4 | 2.5 | 1.8 | 2.3 | 0.7 |
| 3024 | h | 1.9 | 2.5 | 1.7 | 1.8 | 0.1 |

TABLE 4

Tests without PA 6, tear strength in MPa and in % of the starting value

| Component | Unit | Example 6 | Comparison Example 7 | Example 8 | Comparison Example 9 |
|---|---|---|---|---|---|
| PA 6T/66 (A1.1) | wt. % | 69 | 69.4 | — | — |
| PA 6T/6I (A1.2) | wt. % | — | — | 51.0 | 51.4 |

TABLE 4-continued

Tests without PA 6, tear strength in MPa and in % of the starting value

| | | | | | | | | |
|---|---|---|---|---|---|---|---|---|
| Tafmer MC 5020C (D4) | wt. % | — | | — | | 18.0 | | 18.0 |
| KI: Ca stearate 98: 2 wt. % (D2) | wt. % | — | | 0.5 | | — | | 0.5 |
| CuI (D3) | wt. % | — | | 0.1 | | — | | 0.1 |
| Ferrocene (C) | wt. % | 1.0 | | — | | 1.0 | | — |
| Glass fibres (B1) | wt. % | 30 | | 30 | | 30 | | 30 |

| | | Tear strength | | | | | | |
|---|---|---|---|---|---|---|---|---|
| Storage period | — | MPa | % | MPa | % | MPa | % | MPa | % |
| 0 | h | 194 | 100 | 200 | 100 | 92 | 100 | 105 | 100 |

Storage temperature 180° C.

| 504 | h | 194 | 100 | 177 | 89 | 99 | 108 | 92 | 88 |
| 1008 | h | 186 | 96 | 175 | 88 | 91 | 99 | 82 | 78 |
| 1512 | h | 169 | 87 | 140 | 70 | 92 | 100 | 75 | 71 |
| 2016 | h | 153 | 79 | 124 | 62 | 88 | 96 | 74 | 70 |

Storage temperature 200° C.

| 504 | h | 198 | 102 | 160 | 80 | 88 | 96 | 72 | 69 |
| 1008 | h | 185 | 95 | 144 | 72 | 81 | 88 | 66 | 63 |
| 1512 | h | 163 | 84 | 120 | 60 | 69 | 75 | 64 | 61 |
| 2016 | h | 140 | 72 | 102 | 51 | 62 | 67 | 62 | 59 |

Storage temperature 220° C.

| 504 | h | 183 | 94 | 142 | 71 | 73 | 79 | 64 | 61 |
| 1008 | h | 153 | 79 | 105 | 53 | 61 | 66 | 50 | 48 |
| 1512 | h | 89 | 46 | 70 | 35 | 51 | 55 | 45 | 43 |
| 2016 | h | 66 | 34 | 52 | 26 | 40 | 43 | 41 | 39 |

TABLE 5

Tests without PA 6, elongation at break in %

| Component | Unit | Example 6 | Comparison Example 7 | Example 8 | Comparison Example 9 |
|---|---|---|---|---|---|
| PA 6T/66 (A1.1) | wt. % | 69 | 69.4 | — | — |
| PA 6T/61 (A1.2) | wt. % | — | — | 51.0 | 51.4 |
| Tafmer MC201 | wt. % | — | — | 18.0 | 18.0 |
| KI: Ca stearate 98: 2 wt. % (D2) | wt. % | — | 0.5 | — | 0.5 |
| CuI (D3) | wt. % | — | 0.1 | — | 0.1 |
| Ferrocene (C) | wt. % | 1.0 | — | 1.0 | — |
| Glass fibres (B1) | wt. % | 30 | 30 | 30 | 30 |

| Storage period in [h] | — | Elongation at break | | | |
|---|---|---|---|---|---|
| | | % | % | % | % |
| 0 | h | 2.5 | 2.5 | 2.1 | 2.1 |

Storage temperature 180° C.

| 504 | h | 2.5 | 2.0 | 1.8 | 1.2 |
| 1008 | h | 2.3 | 2 | 1.4 | 1.1 |
| 1512 | h | 1.9 | 1.6 | 1.4 | 1.0 |
| 2016 | h | 1.8 | 1.5 | 1.4 | 0.9 |

Storage temperature 200° C.

| 504 | h | 2.5 | 1.7 | 1.3 | 0.9 |
| 1008 | h | 2.3 | 1.5 | 1.1 | 0.8 |
| 1512 | h | 2.0 | 1.2 | 1.0 | 0.8 |
| 2016 | h | 1.7 | 1.1 | 0.8 | 0.8 |

Storage temperature 220° C.

| 504 | h | 2.2 | 1.4 | 1.0 | 0.8 |
| 1008 | h | 1.7 | 1.1 | 0.8 | 0.6 |
| 1512 | h | 1.5 | 0.9 | 0.7 | 0.5 |
| 2016 | h | 1.5 | 0.7 | 0.6 | 0.5 |

Table 6 shows the results of the spiral flow test on the polyamide moulding compounds of Example 1 and of Comparison Example 3.

TABLE 6

Spiral flow test to determine the flow length (flowability) at the polyamide moulding compounds of Example 1 and of Comparison Example 3.

| | Unit | Example 1 | Comparison Example 3 | Example 6 | Comparison Example 7 |
|---|---|---|---|---|---|
| PA 6T/66 (A1.1) | wt. % | 49.94 | 50.6 | 69 | 69.4 |
| PA 6 (A2) | wt. % | 16.8 | 16.8 | — | — |
| Kaolin (B2) | wt. % | 0.26 | 0.26 | — | — |
| KI: Ca stearate 98: 2 wt. % (D2) | wt. % | — | 0.3 | — | 0.5 |
| CuI (D3) | wt. % | — | 0.04 | — | 0.1 |
| Ferrocene (C) | wt. % | 1.0 | — | 1.0 | — |
| Black Masterbatch (D1) | wt. % | 2.0 | 2.0 | — | — |
| Glass fibres (B1) | wt. % | 30 | 30 | 30 | 30 |
| | | Flow length | | | |
| Spiral flow test | mm | 471 | 385 | 449 | 333 |

Discussion of the results

The results of Tables 2 and 3 show that, following storage of the test specimens produced from the polyamide moulding compounds, the polyamide 6-containing polyamide moulding compounds of Examples 1, 2 and 4 according to the invention, which comprise ferrocene (C) as stabiliser, have both an improved tear strength and an improved elongation at break as compared to the polyamide 6-containing polyamide moulding compounds of Comparison Examples 3 and 5, which comprise an inorganic stabiliser from components (D2) and (D3), more specifically at all three storage temperatures (180° C., 200° C. and 220° C.) and a storage time of 504 to 3024 hours.

The results of Tables 3 and 4 show that, following storage of the test specimens produced from the polyamide moulding compounds, the polyamide moulding compounds free from polyamide 6 of Examples 6 and 8 according to the invention, which comprise ferrocene (C) as stabiliser, likewise have both an improved tear strength and an improved elongation at break as compared to the polyamide moulding compounds free from polyamide 6 of Comparison Examples 7 and 9, which comprise an inorganic stabiliser from components (D2) and (D3), more specifically at all three storage temperatures (180° C., 200° C. and 220° C.) and a storage time of 504 to 2016 hours.

The results of Table 6 show that the polyamide moulding compound of Example 1 and 6 according to the invention, which comprises ferrocene (C) as stabiliser, has a significantly improved flowability as compared to the polyamide moulding compound of Comparison Example 3 and 7, which comprises an inorganic stabiliser from components (D2) and (D3).

What is claimed is:

1. A polyamide moulding compound consisting of:
    (A) 27 to 89.99 wt. % of at least one partially crystalline, partially aromatic polyamide (A1) or a polyamide mixture consisting of
        (A1) at least one partially crystalline, partially aromatic polyamide, and
        (A2) at least one caprolactam-containing polyamide with a content of caprolactam of at least 50 wt. %, different from the partially crystalline, partially aromatic polyamide (A1),
    the caprolactam content, in relation to the polyamide mixture, being 5 to 38 wt. %,
    (B) 10 to 65 wt. % of at least one filler selected from the group consisting of fibrous or needle-shaped fillers and particulate fillers,
    wherein the fibrous or needle-shaped filler is selected from the group consisting of glass fibres, carbon fibres, basalt fibres, boron fibres, slag fibres, metal fibres, whiskers, mineral fibres, wollastonite, aramid fibres, ground glass fibres, ground carbon fibres, ground mineral fibres, and mixtures thereof,
    wherein the particulate filler is selected from the group consisting of dolomite, silicates, quartz, talc, mica, kaolin, perlite, silica, precipitated or fumed silicas, diatomaceous earth, titanium dioxide, magnesium carbonate, magnesium hydroxide, aluminum hydroxide, ground or precipitated calcium carbonate, zinc oxide, zinc sulphide, chalk, lime, limestone powder, slate powder, feldspar, barium carbonate, barium sulfate, synthetic phyllosilicates, natural phyllosilicates, permanent-magnetic or magnetizable metals or alloys, glass flakes, glass spheres, hollow glass spheres, hollow-sphere silicate fillers, and mixtures thereof,
    (C) 0.01 to 3.0 wt. % of at least one unsubstituted or substituted metallocene, wherein the substituted metallocene can be substituted, once or more than once, at one or both cyclopentadienyl rings, and
    (D) 0 to 35 wt. % of at least one additive, wherein the at least one additive is selected from the group consisting of inorganic stabilisers, organic stabilisers, antioxidants, antiozonants, light stabilisers, UV stabilisers, UV absorbers, UV blockers, IR absorbers, NIR absorbers, anti-block agents, nucleation agents, crystallisation accelerators, crystallisation retardants, chain-extending additives, conductivity additives, lubricants, dyes, markers, inorganic pigments, organic pigments, carbon black, graphite, carbon nanotubes, graphene, photochromic agents, antistatic agents, release agents, optical brighteners, metallic pigments, metal flakes, and metal-coated particles,
    wherein each of said additive of component (D) is different from component (C),
    components (A) to (D) adding up to 100 wt. %.

2. The polyamide moulding compound according to claim 1, wherein the at least one partially crystalline, partially aromatic polyamide (A1) has at least one of the following properties:
    a relative viscosity (RV), measured according to EN ISO 307 (2007), of 1.45 to 2.10,
    a heat of fusion, measured according to EN ISO 11357-3 (2013), of at least 25 J/g,
    a melting temperature, measured according to EN ISO 11357-3 (2013), of at least 255° C.

3. The polyamide moulding compound according to claim 1, wherein the at least one partially crystalline, partially aromatic polyamide (A1) is formed from the monomers (a1.1) to (a1.2) and optionally (a1.3) and (a1.4):
    (a1.1) at least one diamine, selected from the group consisting of 1,4-butanediamine, 1,5-pentanediamine, 1,6-hexanediamine, 1,8-octanediamine, 1,9-nonanediamine, 1,10-decanediamine, 1,12-dodecanediamine, 2-methyl-1,5-pentanediamine, 2-methyl-1,8-octanediamine, bis(4-amino-cyclohexyl)methane, bis(4-amino-3-methyl-cyclohexyl)methane, bis(4-amino-3,5-dimethyl-cyclohexyl)methane, bis(aminomethyl)cyclohexane, isophoronediamine, m-xylylenediamine and p-xylylenediamine, and
    (a1.2) at least one aromatic dicarboxylic acid, selected from the group consisting of terephthalic acid, isophthalic acid and naphthalenedicarboxylic acid, and optionally
    (a1.3) at least one dicarboxylic acid, selected from the group consisting of 1,6-hexanedioic acid, 1,9-nonanedioic acid, 1,10-decanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, cyclohexanedicarboxylic acid and dimer fatty acids with 36 or 44 C atoms, and/or
    (a1.4) one or more lactams or @-amino acids, selected from the group consisting of lactam-6, lactam-11, lactam-12, 1,6-aminohexanoic acid, 1,11-aminoundecanoic acid and 1,12-aminododecanoic acid.

4. The polyamide moulding compound according to claim 1, wherein the at least one partially crystalline, partially aromatic polyamide (A1) is selected from the group consisting of PA 4T/66, PA 4T/6T, PA 4T/8T, PA 6T/8T, PA 4T/MPMDT, PA 4T/6T/MPMDT, PA 4T/4I, PA 4T/6I, PA 5T/5I, PA 6T/MPMDT, PA 6T/MPMDT/6I, PA 6T/6I, PA 6T/66, PA 6T/6, PA 6T/12, PA 6T/66/6, PA 6T/610, PA 6T/612, PA 6T/10I, PA 6T/9T, PA 6T/12T, PA 6T/61/6, PA 6T/61/66, PA 6T/61/612, PA 6T/61/12, PA 9T/MODT, PA 9T/9I, PA 10T, PA 12T, PA 12T/12I, PA 10T/1012, PA 10T/6T, PA 10T/10I, PA10T/106, PA10T/12, PA10T/11, PA 10T/6T/612, PA 10T/6T/101/6I, PA 10T/6T/1012/612, PA 6T/BACT, PA 6T/BACT/66, PA 6T/6I/BACT/BACI, PA 6T/BACT/MACMT, PA 6T/BACT/PACMT, PA 6T/BACT/TMDCT, PA 4T/6T/8T, PA 4T/6T/10T, PA 4T/8T/10T and PA 6T/8T/10T.

5. The polyamide moulding compound according to claim 1, wherein the at least one partially crystalline, partially aromatic polyamide (A1) is free from lactams and @-amino acids.

6. The polyamide moulding compound according to claim 1, wherein the partially crystalline, partially aromatic polyamide is (A1) PA 6T/66, formed from:
50 mol % 1,6-hexanediamine,
14 to 40 mol % terephthalic acid, and
10 to 36 mol % 1,6-hexanoic acid;
said terephthalic acid and 1,6-hexanoic acid adding up to 50 mol %.

7. The polyamide moulding compound according to claim 1, wherein the at least one substituted or unsubstituted metallocene has a melting temperature of 120° C. to 350° C.

8. The polyamide moulding compound according to claim 1, wherein the at least one substituted or unsubstituted metallocene has, as central metal atom, a metal from group 3 to 12 or the lanthanoids.

9. The polyamide moulding compound according to claim 8, wherein the metal is selected from the group consisting of vanadium, chromium, manganese, iron, cobalt, nickel, ruthenium, osmium, zinc, rhodium, cadmium, iridium, magnesium, lanthanum, cerium, samarium, zirconium, scandium, yttrium and combinations thereof.

10. The polyamide moulding compound according to claim 8, wherein the at least one substituted or unsubstituted metallocene is an unsubstituted or substituted bis(n5-cyclopentadienyl)iron.

11. The polyamide moulding compound according to claim 8, wherein the at least one substituted or unsubstituted metallocene is selected from the group consisting of ferrocene, 3-carboxybutyrylferrocene, 3-carboxypropionylferrocene, 6-mercaptohexylferrocene, aminomethylferrocene, dimethylaminomethylferrocene, diphenylphosphinoferrocene, 1-ferroceneacrylonitrile, 1-ferrocenylethanol, 1,1'-bis (1-hydroxyethyl)ferrocene, 1,1'-diacetylferrocene, 1,l'-diaminoferrocene, 1,1'-dibenzoylferrocene, 1,l'-dibutylferrocene, 1,1'-diethylferrocene, 1, l'-dihexylferrocene, 1,1'-dimethylferrocene, 1,1'-divinyl-ferrocene, 1,l'-ferrocenedicarboxaldehyde, 1,1'-ferrocenedicarboxamide, 1,l'-ferrocenedicarboxylic acid, 1, 1'-ferrocenedimethanol, 1,1'-ferrocenyl-acetic acid, 1,l'-ferrocenylpropanoic acid, 1,l'-ferrocenylbutanoic acid, 1,1'-ferrocenylpentanoic acid, 1,2,3,4,5-pentamethylferrocene,
2-ferrocenylethanol, 3-ferrocenylpropanol, 3-ferrocenylpropanoic acid, 4-ferrocenylbutanoic acid, 5-ferrocenylpentanoic acid, acetylferrocene, a-(N,N-dimethylamino)ethylferrocene, aminoferrocene, ethylferrocene, ferrocenyl-acetic acid, ferrocenylmethanol, octylferrocene, ferrocenecarboxyic acid, ferrocenecarboxamide, ferrocenecarboxaldehyde, propylferrocene, hexylferrocene, hydroxyethylferrocene, benzoylferrocene, butylferrocene, methylferrocene, vinylferrocene and bis (pentamethyl-cyclopentadienyl)iron(II).

12. A moulded article produced from a polyamide moulding compound according to claim 1.

* * * * *